United States Patent [19]
Guo

[11] Patent Number: 6,022,626
[45] Date of Patent: Feb. 8, 2000

[54] COATINGS FOR HIGH TEMPERATURE ENGINE MOUNTS

[75] Inventor: Xiang-Yao Guo, Stratford, Canada

[73] Assignee: The Standard Products Company, Cleveland, Ohio

[21] Appl. No.: 08/639,772

[22] Filed: Apr. 29, 1996

[51] Int. Cl.[7] .............................. B32B 25/04; B32B 25/08
[52] U.S. Cl. .......................... 428/492; 428/494; 428/495
[58] Field of Search ..................................... 428/492, 494, 428/495, 500, 515, 516, 517, 519, 520, 521, 522

[56] References Cited

U.S. PATENT DOCUMENTS

| | | |
|---|---|---|
| 2,137,686 | 11/1938 | Habgood . |
| 2,170,947 | 8/1939 | Habgood et al. . |
| 2,227,900 | 1/1941 | Habgood et al. . |
| 2,824,038 | 2/1958 | Wilson et al. . |
| 2,866,731 | 12/1958 | Van Epp . |
| 3,532,592 | 10/1970 | Kraus et al. . |
| 3,650,874 | 3/1972 | Job et al. . |
| 3,704,741 | 12/1972 | Turk . |
| 3,914,478 | 10/1975 | Johansson et al. ...................... 427/385 |
| 4,332,858 | 6/1982 | Saitoh et al. . |
| 5,039,737 | 8/1991 | Parker et al. . |
| 5,314,741 | 5/1994 | Roberts et al. . |
| 5,492,500 | 2/1996 | Sinclair et al. .......................... 446/220 |

OTHER PUBLICATIONS

Definition of "weathering," "Principles of Polymer Systems," 2nd ed., F. Rodriguez, p. 277, 1982.

Primary Examiner—Terrel Morris
Assistant Examiner—Cheryl Juska
Attorney, Agent, or Firm—Harness, Dickey & Pierce, P.L.C.

[57] ABSTRACT

The performance of natural rubber based products, such as engine mounts which are susceptible to degradation caused by heat, oxidation, ozone attack or ultraviolet radiation is significantly improved by coating exposed surfaces of the product with a polymeric material having excellent heat and oxidation resistance properties. By applying such polymeric coatings having high resistance towards oxidation under excessive heat, the C=C bonds of the natural rubber are protected from oxygen and ozone attacks, thereby allowing its strain-crystallization characteristic properties to be retained.

4 Claims, 2 Drawing Sheets

COATINGS FOR HIGH TEMPERATURE ENGINE MOUNTS

BACKGROUND AND SUMMARY OF THE INVENTION

The present invention relates to improvements in the performance characteristics of components having a natural rubber base which is susceptible to degradation caused by oxidation, ozone attack or ultraviolet radiation, especially under extreme heat, by coating exposed surfaces of the natural rubber based product with one or more elastomers having a high resistance towards oxidation under excessive heat.

Because good durability is a major consideration for rubber engineering components, products formed from natural rubber are fairly common. Components formed from natural rubber tend to have excellent resilience, high tensile strength, high resistance to tearing, good flexibility at low temperatures and excellent mechanical fatigue resistance due to the strain crystallization ability of the material. However, natural rubber based materials tend to have relatively poor resistance toward oxidation, ozone attack and ultraviolet radiation, each of which can cause significant deterioration in the mechanical strength of natural rubber based components. Further, oxidation of natural rubber tends to occur much faster at higher temperatures than would occur at ambient temperatures, thus, the useful life of natural rubber based components used under heated conditions tends to be relatively short.

In general, there are considered to be two main causes for the degradation of natural rubber based components at temperatures in excess of approximately 220° F. The first cause is generally associated with the accelerated reaction of C=C bonds with oxygen and ozone at high temperatures. The other cause relates to the breakdown of polysulfide linkages in vulcanized compounds under excessive heat.

Due to the inherent problems associated with utilizing natural rubber based components in high temperature environments, attention has been focused on using more thermally and oxdatively stable elastomers such as Neoprene, ethylene-propylene terepolymers such as EPDM, hydrogenated nitrile-butadiene rubber and polypropylene oxide, among others. Elastomeric materials such as these have little C=C unsaturation in their polymer chains are less reactive towards oxygen, thereby making them much more stable with respect to high temperature applications, especially in the presence of oxygen and/or ozone. Unfortunately, however, these materials generally fail to offer the resistance against mechanical forces that arise due to their lack of strain crystallization. Further, such materials are generally more expensive than components formed from natural rubber, thus, making them less attractive for high scale production.

While attempts have apparently been made to solve certain problems relating to polymeric substrates in general which are subject to degradation caused by oxygen, ozone and ultraviolet radiation heretofore, the special circumstances involved in high temperature and high mechanical strength requirement applications have not been addressed. For example, U.S. Pat. No. 5,314,741 entitled "Rubber Article Having Protective Coating" which issued on May 24, 1994, to Robert et al. relates to polymeric articles which are coated with hydrogenated synthetic rubbers or polymers obtained by hydrogenating an unsaturated polymer which is a polymer of 1,3-butadiene and optionally one or more monoethylenically unsaturated polymers. The hydrogenated unsaturated polymer or monoethylenically unsaturated polymer based coating is applied as an uncured highly saturated polymer latex which is dried and cured in place on the substrate.

In contrast to other known coatings for polymeric materials which are directed to corrosion resistance or protection against degradation caused by oxidation or ultraviolet light under substantially ambient conditions, it is the primary object of the present invention to provide natural rubber based components which are protected from degradation caused by oxidation, ozone attack or ultraviolet radiation, under extreme heat, by providing the component with a coating of one or more thermally and oxidatively stable elastomers.

It is another object of the present invention to provide coating compositions applicable over natural rubber based materials which are resistant to heat and oxidation, have relatively low gas permeabilities and are durable in nature.

It is another object of the present invention to provide methods for preparing components having a natural rubber base and a coating of one or more thermally and oxidatively stable elastomers.

The present invention relates to natural rubber based components and components which are coated with a natural rubber based material, wherein the components are coated with at least one elastomer.

By applying one or more layers of the elastomeric coatings over a natural rubber based material, the natural rubber based material has an enhanced resistance toward oxidation under excessive heat. Further, the C=C bonds of the natural rubber based material are protected from oxygen and ozone attacks, thereby allowing the natural rubber based material to retain its strain crystallization property. Thus, by coating the natural rubber based material with one of the elastomers, the natural rubber based component or component coated with a natural rubber based material has enhanced resistance toward thermal oxidative aging.

The present invention, while useful under ambient conditions, is particularly useful in environments which are subject to excessive heat. For example, one application of the present invention relates to the manufacture and use of automotive vehicle engine mounts. With the advent of smaller automobiles and front wheel drive systems, engine compartment sizes have generally decreased. This, coupled with the development of more powerful engines and the use of more thermally conductive metals for engine components, has resulted in increased temperatures occurring under the hood. The natural rubber based components and components coated with a natural rubber based material under the present invention are, therefore, ideally suited for engine mounts and gaskets which require a minimal average useful life of at least 3–5 years as is generally required by the automobile manufacturing industry.

Still other applications for the natural rubber based components and components coated with a natural rubber based material which are further coated with an elastomeric coating in accordance with the teachings of the present invention will become apparent to those skilled in the art upon review of the description of the invention and claims, taken in conjunction with the following drawings.

DETAILED DESCRIPTION OF THE PREFERRED EMBODIMENT

Figure 1:
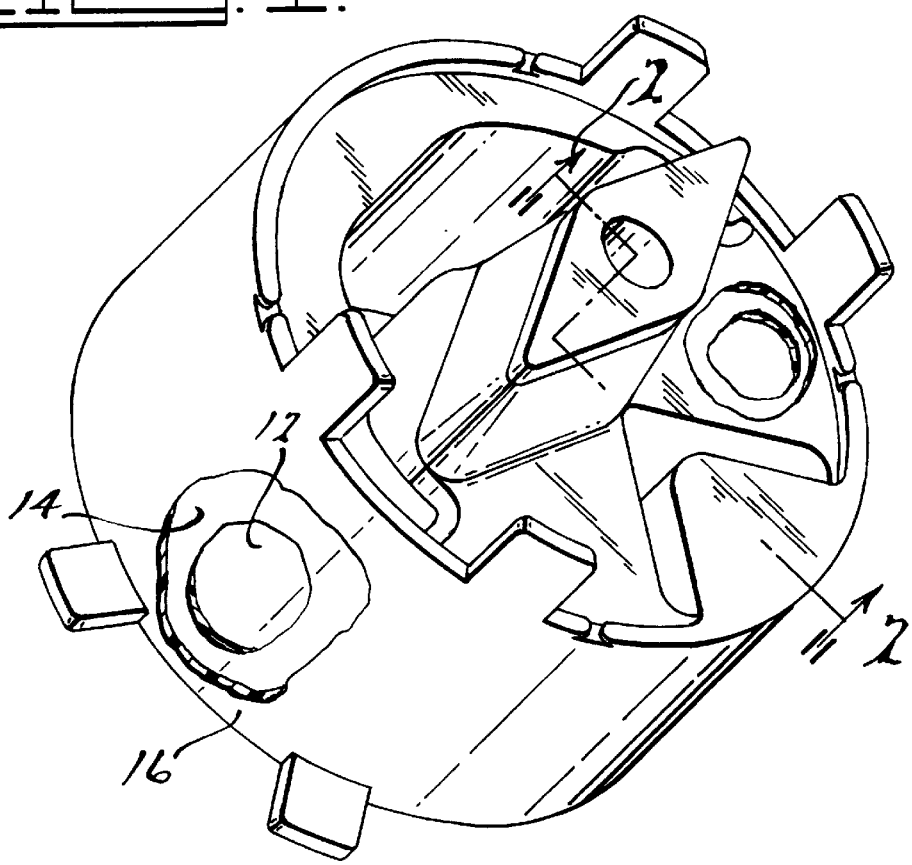
FIG. 1 is a perspective view of a natural rubber based component in the form of an engine mount for use in association with an automotive vehicle.
Figure 2:
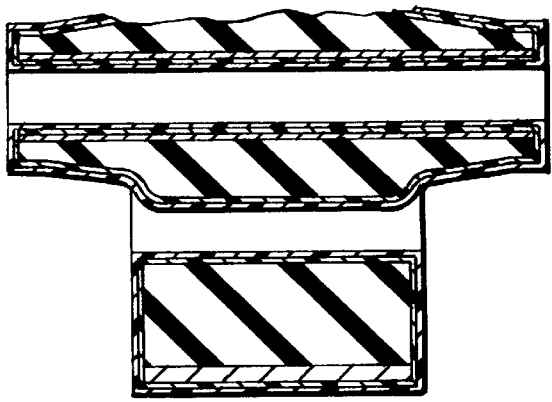
FIG. 2 is a sectional view taken along line 2—2 of FIG. 1 illustrating an inner layer formed from a natural rubber based material and an outer layer formed from an elastomeric material.
Figure 3:
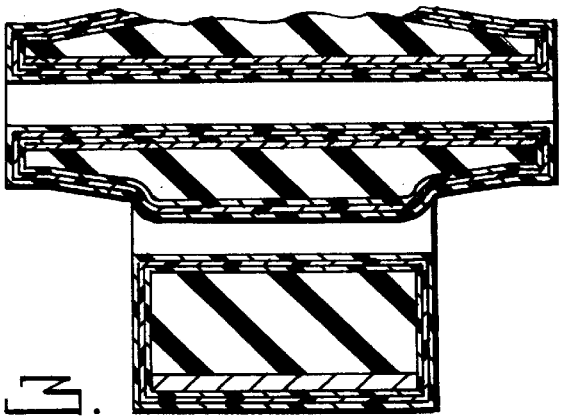
FIG. 3 is a sectional view illustrating an inner layer formed from a natural rubber based material, an intermediate layer formed from a first elastomeric material and an outer layer formed from a second elastomeric material.

Referring to FIG. 1, there is shown a component 10 in accordance with the teachings of the present invention. The component 10 is illustrated for exemplary purposes as being in the form of an automotive vehicle engine mount structure; however, it is to be understood by those skilled in the art that the component can have various geometrical forms and can be employed in numerous environments, especially high temperature environments.

The base 12 includes one or more surfaces 14, hereinafter referred to as exposed surfaces, which are not normally disposed contiguously against a substrate and, thus, would normally be exposed to the atmosphere of the environment in which the component is disposed if not for the coating 16 being applied thereover.

The base 12 is generally formed from a natural rubber based material which is compounded with certain amounts of additives such as anti-oxidants, carbon black, oil and curing agents, or other such additives which are commonly employed in the rubber processing industry. Regardless of the additives employed, if any, the base 12 will preferably include at least 50 wt. % natural rubber, which makes it susceptible to attack by oxygen, ozone and/or UV light, especially when employed in environments reaching temperatures of approximately 220° F. or more.

The component 10 also includes a coating 16 including one or more layers of elastomeric materials which are generally resistant to attack by oxygen, ozone and UV light. The elastomer (or elastomers depending on whether a single or multi-layer coating is employed) is utilized to coat at least the exposed surfaces 14 of the base 12.

Examples of elastomers which are useful in accordance with the teachings of the present invention include neoprene, chlorinated polyethylene, polymers of epichlorohydrin, ethylene-acrylic copolymers, polyacrylates, halogenated polyisobutylene and polypropylene oxide, among others. Additionally, certain commercially available elastomer based products such as HYPALON® which is a chlorosulfonated polyethylene based material available from DuPont of Wilmington, Del., is also considered to be useful as a coating for the natural rubber based material.

Depending mainly upon the intended use of the component, the thickness of each coating layer can be varied over a relatively broad range. For example, the thinnest coatings would be those having an average thickness of approximately 0.5 mils where the exposed surfaces 14 of the base 12 merely need to be covered. For more strenuous applications, such as for components employed continuously in high temperature environments, the average thickness of the coating layer may be approximately 2.0 mils.

Preparation of Samples of Degradation Analysis

Various samples were prepared in accordance with the teachings of the present invention to analyze for degradation at elevated temperatures. To conduct the analysis, seven engine mount structures formed from natural rubber SMR CV60 available from H.A. Astleft, Inc., of Toronto, Canada, having an average thickness of 90 mm were molded into the desired engine mount shape. Three of the samples were initially coated with a layer of neoprene having an average thickness of approximately 1.4 mils by dipping the mount into the coating for approximately two seconds, then lifting the mount out from the neoprene coating.

The neoprene coating was dried upon each natural rubber base 12 in an over preheated to 160° F. for twenty minutes immediately after applying the coating. Thereafter, a second layer of material known as HYPALON® having an average thickness of approximately 0.6 mils was applied over the layer of neoprene on each base by the same dipping process as for the neoprene coating.

Once coated with the layer of HYPALON®, each sample was again dried in an oven preheated to 160° F. for twenty minutes. After partially curing the second layer, the samples including the first and second layers of coating were placed in a second oven preheated to 300° F. for sixty minutes to allow both layers of coating to fully cure.

In addition to the three coated samples designated as Samples 1, 2 and 3 in Table 1, two additional uncoated bases designated as Samples 4 and 5 in Table 1 also having an average thickness of 90 mm and being formed from the same materials as the previous bases were heated at 300° F. for sixty minutes for use as controls in the analysis. Finally, two uncoated and unheated bases designated as Samples 6 and 7 having an average thickness of 90 mm formed from the same material as the other bases were utilized to measure for static and dynamic rate constants for each sample without the 60 minutes heating at 300° F.

The static and dynamic rate constants were measured on an MTS 831 Elastomer Test System wherein the static rate constants were measured during a deflection experiment at a –1300N load and the dynamic rate constants were measured under a –1300N static load with a 1 mm displacement at 15 Hz.

As indicated in Table 1 below, the coated mounts of Samples 1, 2 and 3 had higher rate constants than each of the uncoated Samples. As a result of the static and dynamic test results, the increase in rate constants is partially attributable to the molecular changes caused by heating the samples for 60 minutes in an oven preheated to 300° F.; this is demonstrated by the higher rate constants of Sample 4 and 5 compared to Samples 6 and 7.

TABLE I

| Sample No. | Static Rate Constant (N/mm) | Dynamic Rate Constant (N/mm) |
| --- | --- | --- |
| 1 | 370 | 530 |
| 2 | 389 | 552 |
| 3 | 371 | 536 |
| 4 | 358 | 535 |
| 5 | 351 | 512 |
| 6 | 336 | 475 |
| 7 | 333 | 473 |

Figure 4:
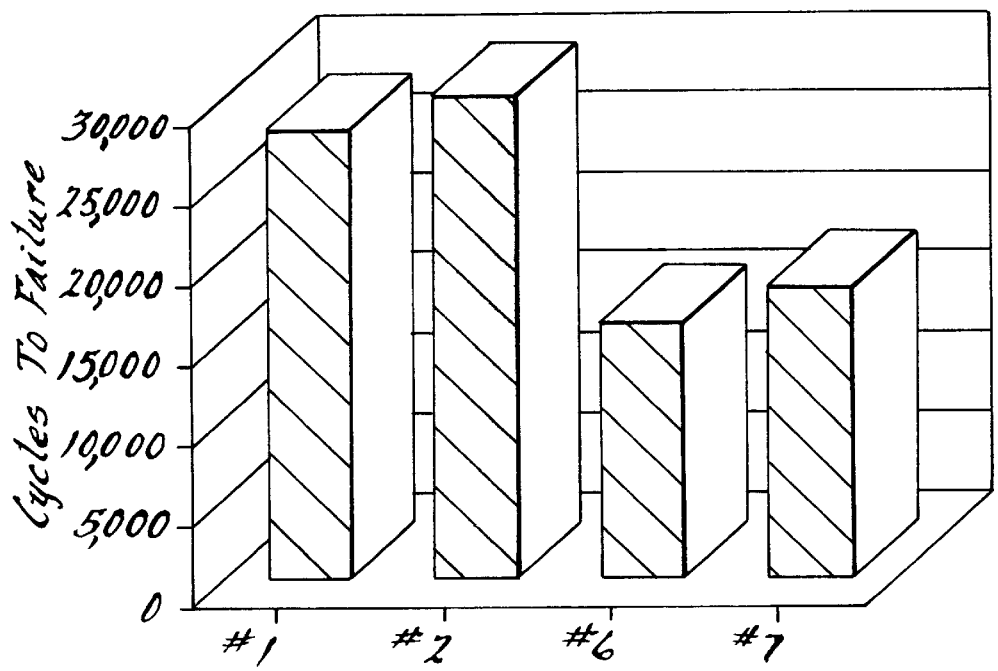
FIG. 4 is a graph illustrating the fatigue results for coated versus uncoated samples.

In addition to the static and dynamic rate constant analysis, fatigue life tests ted on certain of the above identified samples as illustrated in FIG. 4.

The fatigue tests were carried out at 250° F. under –1300+/–4000N loads at 2 Hz frequency. As can be seen from a review of FIG. 4, the coated engine mounts represented by Samples 1 and 2 offered a much better durability than the uncoated engine mounts represented as Samples 6 and 7, all of them made of production grade natural rubber based compound. In addition to the improved durability offered by the coatings, it is important to also note that coatings did not appear to be cracked or otherwise broken after the tests were completed.

In addition to the foregoing analysis, samples were also prepared to study the effects of thermoxidative aging on both coated and uncoated engine mount structures. To conduct such analysis, initially six engine mounts were prepared from a heat resistant natural rubber based compound having an average thickness of 90 mm each. Three of the engine mounts, designated as Samples 1, 2 and 3 in Table II, were coated with a first layer of neoprene and dried in an oven preheated to 160° F. for twenty minutes as described above. Thereafter, the three engine mounts of Samples 1, 2 and 3 were coated with a layer of HYPALON® and dried at 160° F. for twenty minutes. Once dried, the samples were cured at 300° F. for one hour. The other three engine mounts designated as Samples 4, 5 and 6 in Table II were uncoated and utilized as control samples.

The thermoxidative aging analyses were carried out in an oven preheated to 260° F. and maintained under a steady air circulation. The aging time for successive sets of the samples were varied such that Samples 1 and 4 were not aged, Samples 2 and 5 were aged within the oven for 120 hours and Samples 3 and 6 were aged for 336 hours, respectively.

As illustrated in Table II, the dynamic properties of Samples 1–6, while generally improved for coated versus uncoated samples, showed relatively little change in the Ks, Kd and tan δ values for the coated mounts as measured by the MTS 831 Elastomer Test System. In theory, the limited improvement shown resulted in part from the shorter -S-S- linkages found in heat resistant natural rubber compounds as opposed to production grade natural rubber compounds. Heat resistant natural rubber compounds tend to be more stable than production grades after a short period of heating.

TABLE II

| Sample No. | Static Rate Constant, Ks (N/mm) | Dynamic Rate Constant, Kd (N/mm) | tan δ |
| --- | --- | --- | --- |
| 1 | 357 | 503 | 0.091 |
| 2 | 358 | 512 | 0.094 |
| 3 | 338 | 483 | 0.088 |
| 4 | 346 | 485 | 0.083 |
| 5 | 335 | 496 | 0.085 |
| 6 | 344 | 502 | 0.084 |

Ks = static rate constant, Kd = dynamic rate constant and Tan δ = energy dissipation factor of rubber under dynamic application.

Figure 5:
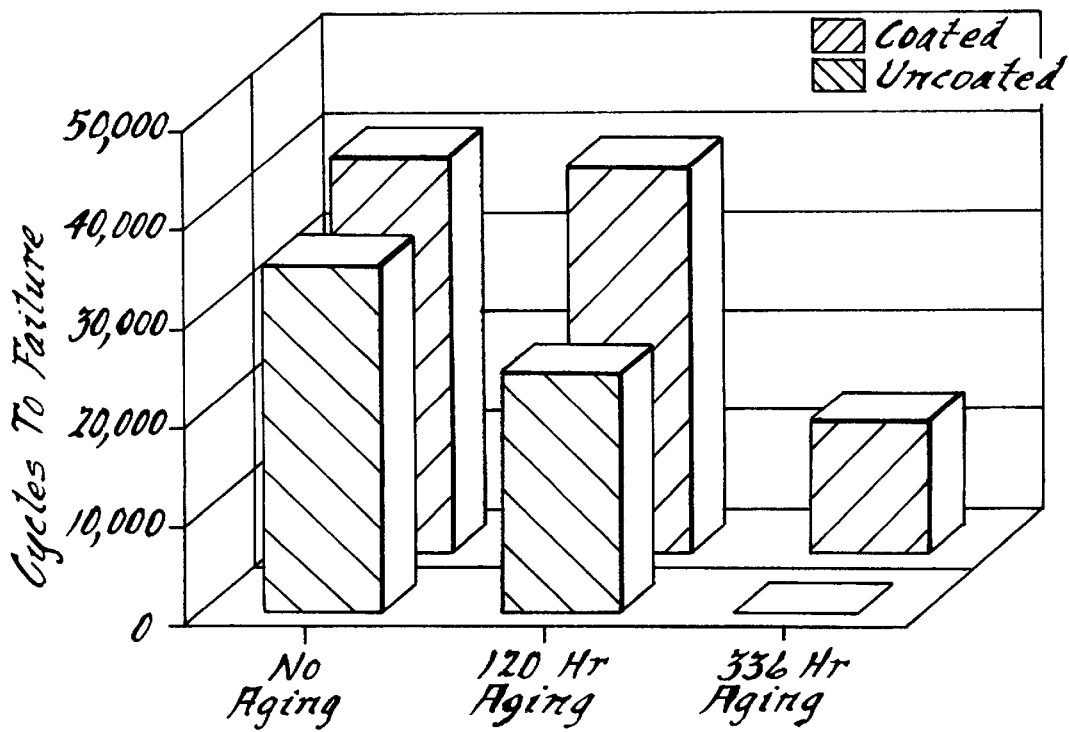
FIG. 5 is a graph illustrating the durability results for coated samples at various ages.

As illustrated in FIG. 5, by applying coatings to protect the C=C bonds in natural rubber, the fatigue lives of the mounts maintained at elevated temperatures for extended periods of time were extended. For example, after 120 hours of aging at 260° F. the fatigue life for the coated mount was as good as that of an unaged mount. In contrast, the uncoated engine mount that was heated for 120 hours at 260° F. had a fatigue life which was 32% shorter than the corresponding coated engine mount.

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

I claim:

1. An engine mount structure, comprising:

a base layer formed from natural rubber, wherein said base layer is susceptible to degradation caused by heat, oxidation, ozone attack or ultraviolet radiation; and a coating formed from at least one polymeric material, said polymeric material being selected from the group consisting of chlorinated polyethylene, chlorosulfonated polyethylene, polymers of epichlorohydrin, ethylene-acrylic copolymers, ethylene-propylene terpolymer, halogenated polyisobutylene, neoprene, polyacrylate, polypropylene oxide, and combinations thereof;

wherein said coating is applied to said base layer, wherein said coating is fully cured after being applied to said base layer, wherein said coating is applied to said base layer such that said base layer is protected from degradation once said coating is fully cured.

2. The engine mount structure of claim 1, wherein said coating is applied to said base layer such that said coating adheres directly to said base layer.

3. An engine mount structure, comprising:

a base layer formed from natural rubber, wherein said base layer is susceptible to degradation caused by heat, oxidation, ozone attack or ultraviolet radiation; and a coating applied to said base layer which is formed from at least one polymeric material, said polymeric material being selected from the group consisting of chlorinated polyethylene, chlorosulfonated polyethylene, polymers of epichlorohydrin, ethylene-acrylic copolymers, ethylene-propylene terpolymer, halogenated polyisobutylene, neoprene, polyacrylate, polypropylene oxide, and combinations thereof;

wherein said coating is fully cured after being applied to said base layer, wherein upon the full curing of said coating said base layer is protected from degradation occurring at greater than ambient temperature.

4. The engine mount structure of claim 3, wherein said coating is applied to said base layer such that said coating adheres directly to said base layer.

* * * * *